United States Patent
Bell et al.

(10) Patent No.: US 9,547,085 B2
(45) Date of Patent: Jan. 17, 2017

(54) COMPUTER-IMPLEMENTED SYSTEM AND METHOD FOR DETECTING VEHICLE OCCUPANCY

(71) Applicant: Palo Alto Research Center Incorporated, Palo Alto, CA (US)

(72) Inventors: Alan G. Bell, Los Altos, CA (US); Alexander Tuganov, Redwood City, CA (US); Patrick Y. Maeda, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 302 days.

(21) Appl. No.: 14/280,491

(22) Filed: May 16, 2014

(65) Prior Publication Data

US 2015/0331105 A1    Nov. 19, 2015

(51) Int. Cl.
| | |
|---|---|
| *G01C 3/08* | (2006.01) |
| *G01S 17/42* | (2006.01) |
| *G01S 17/02* | (2006.01) |
| *G01S 17/89* | (2006.01) |
| *G01S 7/48* | (2006.01) |
| *G01S 17/50* | (2006.01) |

(52) U.S. Cl.
CPC .............. *G01S 17/42* (2013.01); *G01S 7/4808* (2013.01); *G01S 17/026* (2013.01); *G01S 17/89* (2013.01); *G01S 17/023* (2013.01); *G01S 17/50* (2013.01)

(58) Field of Classification Search
CPC ...... G01S 17/023; G01S 17/026; G01S 17/42; G01S 17/89; G01S 7/4808
USPC .......................................................... 356/5.01
See application file for complete search history.

(56) References Cited

U.S. PATENT DOCUMENTS

| | | | | |
|---|---|---|---|---|
| 8,611,608 | B2* | 12/2013 | Fan ..................... | G06K 9/00234 382/100 |
| 8,824,742 | B2* | 9/2014 | Skaff ................... | G06K 9/00785 382/104 |
| 2008/0048887 | A1* | 2/2008 | Aoki .................... | G01S 7/4802 340/937 |
| 2008/0267460 | A1* | 10/2008 | Aoki .................... | B60R 21/017 382/118 |
| 2009/0059201 | A1* | 3/2009 | Willner .................. | G01S 7/491 356/5.01 |
| 2013/0107016 | A1* | 5/2013 | Federspiel ......... | H04N 13/0253 348/49 |

(Continued)

*Primary Examiner* — Mark Hellner
(74) *Attorney, Agent, or Firm* — Patrick J. S. Inouye; Krista A. Wittman

(57) ABSTRACT

A computer-implemented system and method for detecting vehicle occupancy is provided. Light beam pulses emitted from a lidar system are applied to a passing vehicle. Scans of an object are generated from the light beam pulses. A signal is received from each of the beam pulses reflected at a point of reflection along a segment of the vehicle. A time is measured from when each beam pulse was emitted to receipt of the signal. A distance of the signal from the lidar system is calculated using the measured time. The points of reflection for that vehicle segment are positioned in relation to one another as a scan. The scans are compiled in a consecutive order according to the vehicle and a three-dimensional image of an interior of the vehicle is generated from the consecutive scans. A presence or absence of vehicle occupancy is determined based on the three-dimensional image.

18 Claims, 9 Drawing Sheets

(56) References Cited

U.S. PATENT DOCUMENTS

| | | | | |
|---|---|---|---|---|
| 2013/0148845 A1* | 6/2013 | Maeda | ................. | G01S 17/023 |
| | | | | 382/103 |
| 2015/0260830 A1* | 9/2015 | Ghosh | .................... | G01S 7/484 |
| | | | | 250/208.1 |

* cited by examiner

COMPUTER-IMPLEMENTED SYSTEM AND METHOD FOR DETECTING VEHICLE OCCUPANCY

FIELD

This application relates in general to identifying objects and, in particular, to a computer-implemented system and method for detecting vehicle occupancy.

BACKGROUND

As a means to reduce traffic, many cities are encouraging drivers to carpool, such as by providing carpool only lanes, which are generally less crowded, or reducing costs otherwise required in full by single occupant vehicles. Each city can set the required number of occupants to qualify as a carpool for receiving carpool benefits. However, many cities do not have means to enforce the carpool status, other than using an on-duty patrol person to watch the cars as they pass by and manually count the number of occupants.

If a violation is identified, the patrol officer must pull the driver of the violating vehicle off the road and issue a citation. Using employee resources can be time consuming and costly for the city. Additionally, only a sample of vehicles are monitored based on times when a patrol person is available for enforcement. Therefore, violations may not be strictly monitored due to a lack of enforcement.

Attempts to automate carpool enforcement and tolling have been made, but are generally inadequate. For example, high-occupancy vehicle (HOV) lanes are restricted for exclusive use by vehicles that include the designated number of passengers, including the driver. Cars that do not have a minimum number of designated passengers may receive a ticket, such as in the mail. Cameras are used to enforce the occupancy requirement by taking photographs of passing vehicles in the HOV lanes and the photographs are subsequently analyzed to determine occupancy. However, in a photograph, occupants can be occluded by objects in the car or by glare off the vehicle windows. For example, occupants in the back seat can be blocked by front seats in the vehicle when the camera is positioned in front of the car. Further, photographs are influenced by glare, which can obscure occupants in the vehicle. Thus, use of a camera is an unreliable and inaccurate means for determining occupancy.

Additionally, some cities use FasTrak® lanes, a registered trademark of San Joaquin Hills Transportation Corridor Agency and Foothill/Eastern Transportation Corridor Agency Joint Powers Agency of California, that allow vehicles with the required carpool occupancy to drive in a particular lane and to be charged accordingly based on a toll tag that is mounted on a vehicle's windshield. Subsequently, as the vehicle passes through the automatic tolling area, the rate charged is based on the lane in which the vehicle is located. Thus, the FasTrak® system relies on drivers to truthfully select the correct lane based on vehicle occupancy. The carpool discounts can be enforced using cameras, as described above, which may not be completely reliable due to positioning of the camera and glare from the camera flash or sun. Further, designating particular lanes for carpools is undesirable since the carpool lanes are generally located to one side of the road and vehicles that do not satisfy the carpool requirements may have to cross multiple lanes of traffic to make a desired turn after passing through the tolling area.

Finally, High-Occupancy Toll (HOT) lanes are designated carpool lanes that allow vehicles that do not qualify as a carpool to pay a predetermined fee and utilize the carpool lanes via a pass installed on a window of the vehicle. A switchable pass allows drivers to turn on or off the pass based on a number of occupants in the vehicle, which relies on an honor system for charging single drivers. Again, use of and payment for the carpool lanes by non-carpool vehicles are generally only enforced by an honor system, manual enforcement, or via a camera, each of which is can be unreliable as described above.

Therefore, there is a need for determining a number of occupants within a vehicle. Preferably, the determined occupancy is used for automatic carpool enforcement and tolling.

SUMMARY

A computer-implemented system and method for detecting vehicle occupancy is provided. Light beam pulses emitted from a lidar system are applied to a passing vehicle. Scans of an object are generated from the light beam pulses. A signal is received from each of the beam pulses reflected at a point of reflection along a segment of the vehicle. A time is measured from when each beam pulse was emitted to receipt of the signal. A distance of the signal from the lidar system is calculated using the measured time. The points of reflection for that vehicle segment are positioned in relation to one another as a scan. The scans are compiled in a consecutive order according to the vehicle and a three-dimensional image of an interior of the vehicle is generated from the consecutive scans. A presence or absence of vehicle occupancy is determined based on the three-dimensional image.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Conventional methods for determining occupancy in a vehicle include manual inspection and cameras. However, cameras can be unreliable as camera images can be occluded by objects and are influenced by glare. Further, manual determinations of occupancy are burdensome and costly. Use of a scanning lidar system provides accurate and reliable data for determining occupancy of a vehicle via a three-dimensional image, which can be used for automatic tolling and carpool enforcement.

Figure 1:
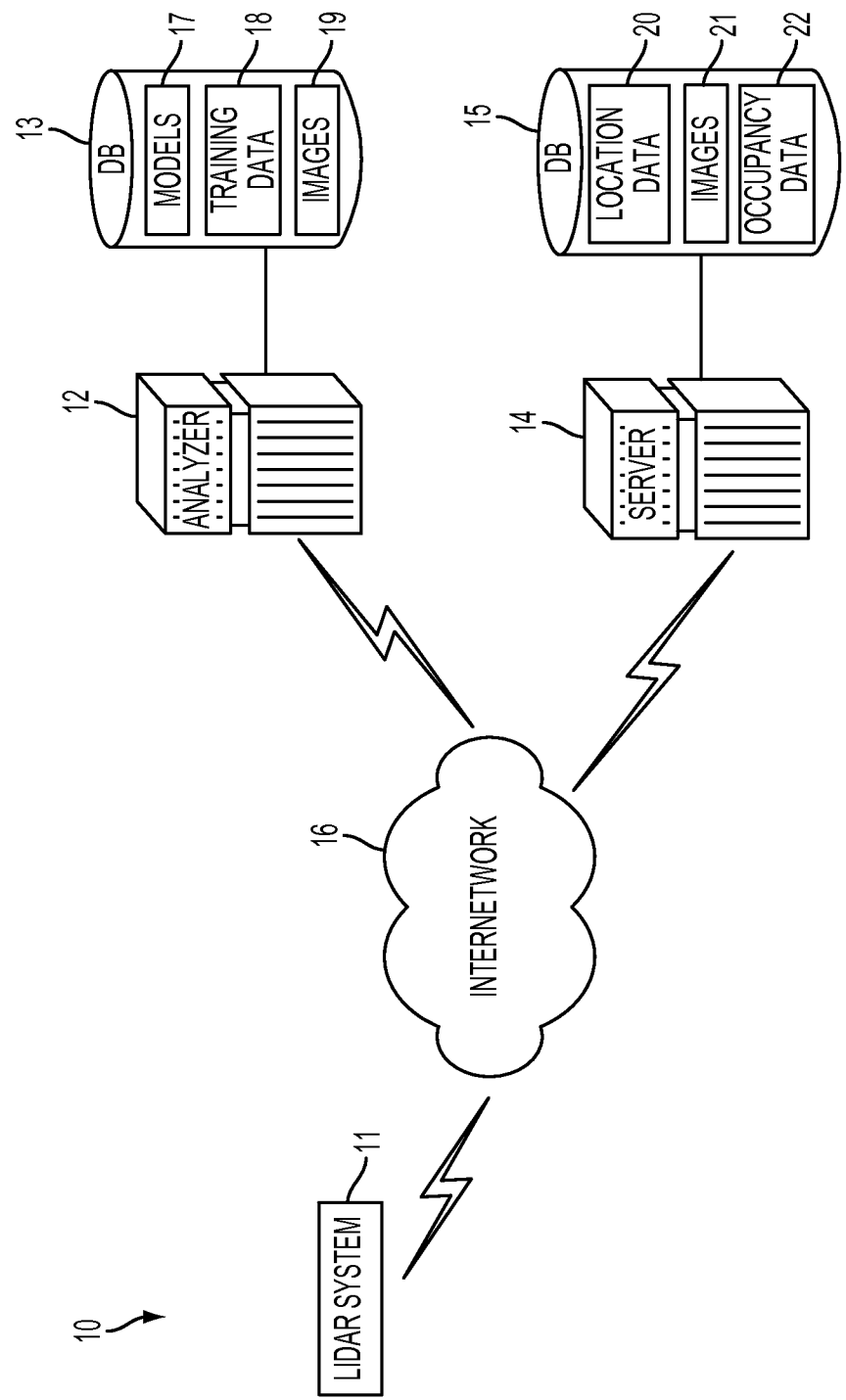
FIG. 1 is a block diagram showing a computer-implemented system for detecting vehicle occupancy, in accordance with one embodiment.

The scanning lidar system measures distances of objects or surfaces encountered by a light beam emitted from the system. The beam can be a laser beam or other light source, including a light-emitting diode. The distances can be used to generate a three-dimensional image for automatically determining occupancy. FIG. 1 is a block diagram showing a computer-implemented system 10 for detecting vehicle occupancy. A lidar system 11 is positioned, for example, on an overpass or lamp post along a road or highway and emits light beam pulses toward a passing vehicle (not shown) to measure a time for each pulse of the light beam to reflect off an object in an interior of the vehicle and return to the lidar system. The time data can be stored within the lidar system and used to determine a distance travelled by each pulse and a location 20 for each point of reflection by the pulses. In a further embodiment, the path time and distances of the light beam can be obtained using a time-of flight camera, as further described in commonly-owned U.S. Patent Application Publication No. 2013/0148845, to Maeda, the disclosure of which is hereby incorporated by reference.

The reflection points can be mapped using the locations 20 to provide a three-dimensional image 19, 21 of the vehicle, including an interior. The lidar system can transmit the image via an internetwork 16, such as the Internet, to an analyzer 12 that is interconnected to a database 13, in which the image is stored. The analyzer 12 can process the image using, for example, image recognition techniques, including algorithmic approaches and machine learning. Specifically, the analyzer can determine whether occupants are located in the vehicle based on models 17 and training data 18, which can be stored in the database 13 coupled to the analyzer 12. In a further embodiment, a specific number of the occupants can also be calculated. Image processing is further discussed below with reference to FIG. 6.

The location data 20, images 21, and occupancy determinations 22 can be stored in the database 13 interconnected to the analyzer 12 or in a separate database 15 that is coupled to a server 14 interconnected to both the lidar system 11 and analyzer 12. In a further embodiment, the lidar system 11 or server 14 can include the analyzer 12. In yet a further embodiment, the lidar system 11 and the server 14 can be maintained by a common entity, such as a state, city, or municipality, to monitor vehicles for purposes of tolling and carpool enforcement, while the analyzer can be maintained by a third party.

The lidar system 11, analyzer 12, and server 14 each include components conventionally found in general purpose programmable computing devices, such as a central processing unit, memory, input/output ports, network interfaces, and non-volatile storage, although other components are possible. Moreover, other information sources are possible.

Additionally, the lidar system 11, analyzer 12, and server 14 can each include one or more modules for carrying out the embodiments disclosed herein. In one example, the modules can include an occupancy determination module, and occupancy identification module, a signal receipt module, and a distance module, as well as other modules. The modules can be implemented as a computer program or procedure written as source code in a conventional programming language and is presented for execution by the central processing unit as object or byte code or written as interpreted source code in a conventional interpreted programming language interpreted by a language interpreter itself executed by the central processing unit as object, byte, or interpreted code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
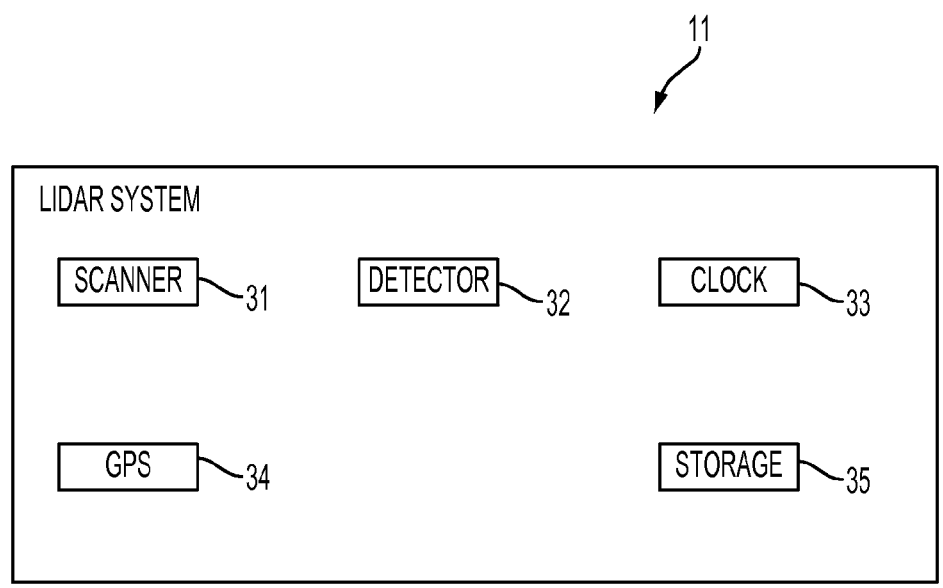
FIG. 2 is a block diagram showing, by way of example, the lidar system of FIG. 1.

The lidar system can include components to calculate distance and location data for stationary and mobile vehicles to determine occupancy. FIG. 2 is a block diagram showing, by way of example, the lidar system of FIG. 1. The lidar system 11 can include a scanner 31, detector 32, clock 33, Global Positioning System ("GPS") 34, and storage 35. Other components are possible, including a transmitter and receiver. The scanner 31 emits one or more beams of light pulses through the windows of a vehicle to obtain distance data for any objects encountered within an interior of a vehicle, including occupants. The light beam can be emitted on a continuous, periodic or as-requested basis, and is generally in the near-infrared region of the electromagnetic spectrum, but can have wavelengths in the infrared, blue-green, and ultraviolet ranges. The scanner can include a mirror that scans to project the pulses over a portion of a non-moving vehicle. Further, multiple beams can be useful to obtain location data for non-moving or slow-moving objects. In one example, 16 or 32 beams, emitted three inches apart can be used to cover a large area of the vehicle, regardless of the vehicle size.

The scanner can be three-dimensional ("3D") or two-dimensional ("2D"). A 3D scanner emits multiple light beams separated by a predetermined distance to scan a volume of an object by changing directions of the object view and can be useful for stationary or slow moving vehicles, such as in a traffic jam, at a stop light, or at a toll booth. The view direction can be changed either by rotating a rangefinder of the scanner, or by using one or more rotating mirrors. The mirrors can rotate to force the light pulses to sweep at an angle. Meanwhile, a 2D scanner can be used to reduce costs required for 3D scanners. The 2D scanner can generate three-dimensional images based on movement of the vehicle being detected. For instance, as the vehicle drives past the lidar system with a 2D scanner, scans, or reflection points representing different areas of the vehicle are identified, which can be used to generate the 3D image, instead of a rotating rangefinder or mirror.

Once emitted by the scanner, each light pulse reflects off an object at a reflection point and returns to the lidar system. Specifically, a laser light passes through the vehicle window and reflects off an interior of the car, including car seats, headrests, or steering wheel, as well as other vehicle components. Further, the light pulse can reflect off an object, which is not a part of the car, but is located in the vehicle, including people, boxes, baby seats, luggage, or other types of items that can be placed in the vehicle. The light pulse can be returned to the lidar system as a single reflected return or multiple reflected returns. The number of returns depends on a number of surfaces encountered by the light pulse.

Subsequently, the clock 33 records a difference in time between the emission of each light pulse and receipt of that reflected pulse back at the lidar system. The distance between the lidar system 11 and each reflection point is calculated based on the travel time of each pulse and the speed of light. Meanwhile, if the lidar system is mobile, the GPS 34 determines x, y and z coordinates of the scanner. For example, the lidar system can be affixed to a top of a police car to enforce carpool limits and discounted tolling for carpools. Otherwise, if the lidar system is permanently affixed to a tolling station or post, GPS is not required. The pulse travel distance is combined with the positional information of the scanner to calculate coordinates of each reflection point. Specifically, the reference points are each transformed into georeferenced x, y and z coordinates based on the location of the scanner, an angle of the scan mirror, and a distance of the lidar system to the object. The collection of reference points can form a point cloud, or three-dimensional image, that outlines objects in the vehicle interior. Occupancy can be determined from the image. Further, the image, pulse travel time and distance, and reference point locations can be maintained in a storage 36 associated with the lidar system 11.

Figure 3:
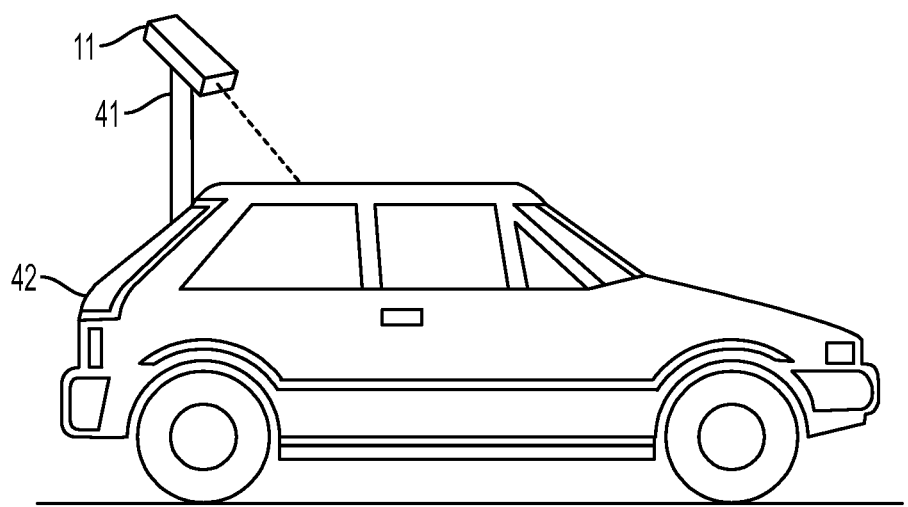
FIG. 3 is a block diagram showing, by way of example, the lidar system of FIG. 1 positioned in relation to a vehicle.

One or more lidar systems can be used individually or in combination for determining occupancy of a single vehicle. FIG. 3 is a block diagram showing, by way of example, the lidar system of FIG. 1 positioned in relation to a vehicle 42. The lidar system 11 is mounted on a support post 41 such that the light beam pulses are directed to pass through a side window of the vehicle 42. However, the lidar system 11 can also be directed to emit light beams through the front windshield or back window of the vehicle 42. A further lidar system (not shown) can be located adjacent to the lidar system 11, on the opposite side of the vehicle, or in front of or in back of the vehicle. In a different embodiment, a camera can be installed adjacent to the lidar system. The camera can take a photograph of the front seat, while the lidar system is directed to the back seat and a point cloud of the back seat is generated. The data from the photograph and point cloud can be used to determine an occupancy of the vehicle, as further described in detail below.

A distance between the lidar system 11 and vehicle 42 depends on a type of lidar system used, including a range of the beam for the selected lidar system. The lidar system 11 can also be mounted on an overpass, sign, light pole, tool both, fence, or lane divider, and can be directed to emit a beam through other windows in the vehicle. At a minimum, the lidar system should be positioned to direct a beam through at least one window.

The light beams are emitted from the lidar system using an up and down motion over a moving vehicle. The beam encounters a surface, such as the vehicle itself or an object within the vehicle, and is reflected back to the lidar system at a point of reflection on a surface of the vehicle or object encountered. Position data for the reflection point can be determined from the up and down movement of the light beams, the left to right, or right to left movement of the vehicle past the lidar system, and the distance of the reflection point from the lidar system. The points of reflection are then combined in a single display using the position data to generate a surface of an object that is represented by the points, as further described below with reference to FIG. 5. Specifically, the vehicle moves past the lidar system and reflection point scans of different segments of the vehicle are consecutively obtained. The scans are consecutively combined to generate an outline of a least a portion of the vehicle and objects within the vehicle.

The lidar system can identify a window, in contrast to an individual, based on a distance of the return beams from the lidar system or an intensity of light reflected off the window versus an object located in an interior of the vehicle. Windows are represented by points of reflection with a shorter distance to the lidar system than objects within the vehicle, which are located at a greater distance. Also, with regards to intensity, the reflected light from the window generally has a lower intensity than a reflection off an object in the vehicle. The lidar system generally emits a light beam of a single or limited wavelength and broadband reflections from the sun or other illumination sources are infrequent at the wavelength of the lidar system beam, preventing glare to obscure objects in the vehicle's interior.

In yet a further embodiment, multiple light beam returns are possible and can provide additional data, which can be used to distinguish between a window and an object within the car. For instance, one or more of the light beam pulses emitted from the lidar system can encounter a first object, which results in two or more reflection points, the first obtained from the encounter with the first object and the second obtained from a further encounter with another object. Specifically, when the light beam encounters a window, the window both reflects the beam back to the lidar system and transmits the beam towards a second object. When the lidar system is used on a passing vehicle, a light beam may first encounter a window of the vehicle and generate a first point of return by one of the beams and a further beam that extends inside the vehicle. The further beam can encounter an object inside the vehicle, such as a person, which generates a second point of return. The points of return for the window and the person can be distinguished based on a measured time for each beam to return to the lidar system, the distance each beam traveled from the encountered object to the lidar system, and an intensity of the return beam to the lidar system.

After locating the window, a point cloud is generated for the space inside the window based on the return, or reflection, points from objects within the vehicle. The returns with a longer return time and a further distance are more likely to represent an object within the vehicle, rather than a window of the vehicle. The intensity provides a strength of the return beam, which can depend on reflectance properties of the object off which the return beam was reflected. Generally, with respect to a vehicle, returns off the window will be less intense than off other objects within the vehicle, such as a person.

Figure 4:
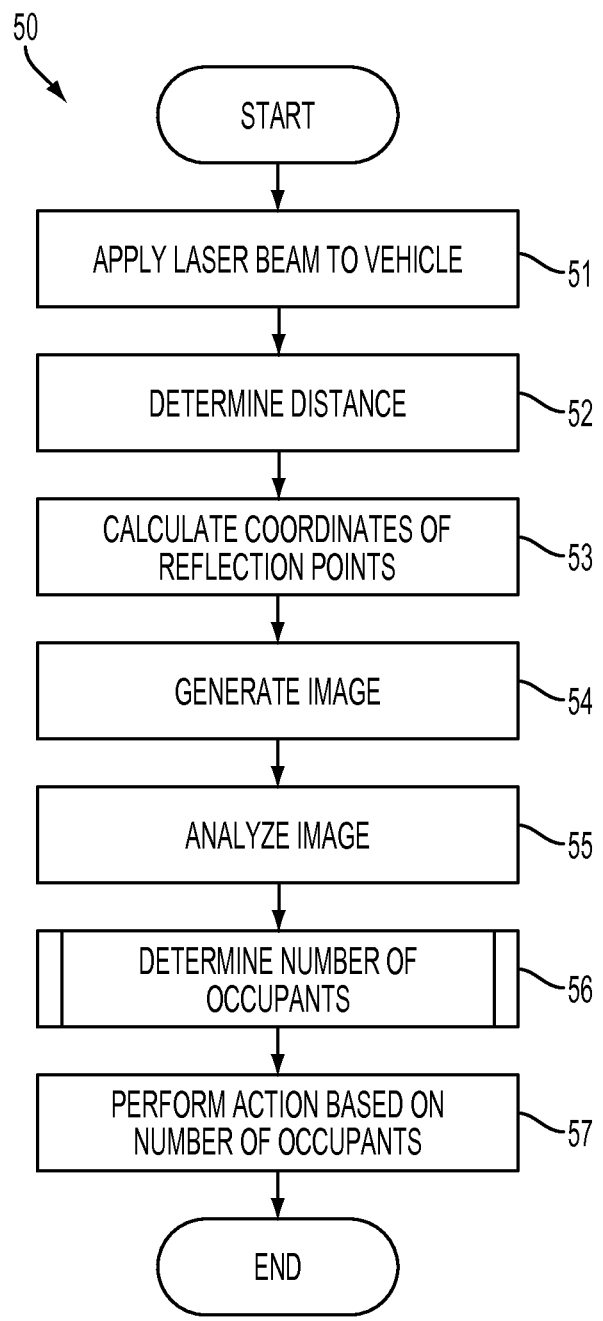
FIG. 4 is a flow diagram showing a computer-implemented method for detecting vehicle occupancy, in accordance with one embodiment.

The reflection point data obtained by the scanner can be used to generate a 3D image for determining vehicle occupancy. FIG. 4 is a flow diagram showing a computer-implemented method for detecting vehicle occupancy, in accordance with one embodiment. As a vehicle drives by, the lidar system emits (step 51) light beam pulses toward the vehicle. In particular, the light beam pulses pass through the windows of the vehicle and eventually reflect off objects in the vehicle's interior to determine a distance (step 52) of the reflection points from the lidar system. The objects can include, inter alia, car seats, headrests, and people, as well as other objects that can be placed in a vehicle. Location coordinates for each of the reflection points can be determined (step 53) from the respective distances, as described above with reference to FIG. 3 and a location of the scanner, and used to generate a 3D image for determining occupancy.

Figure 5:
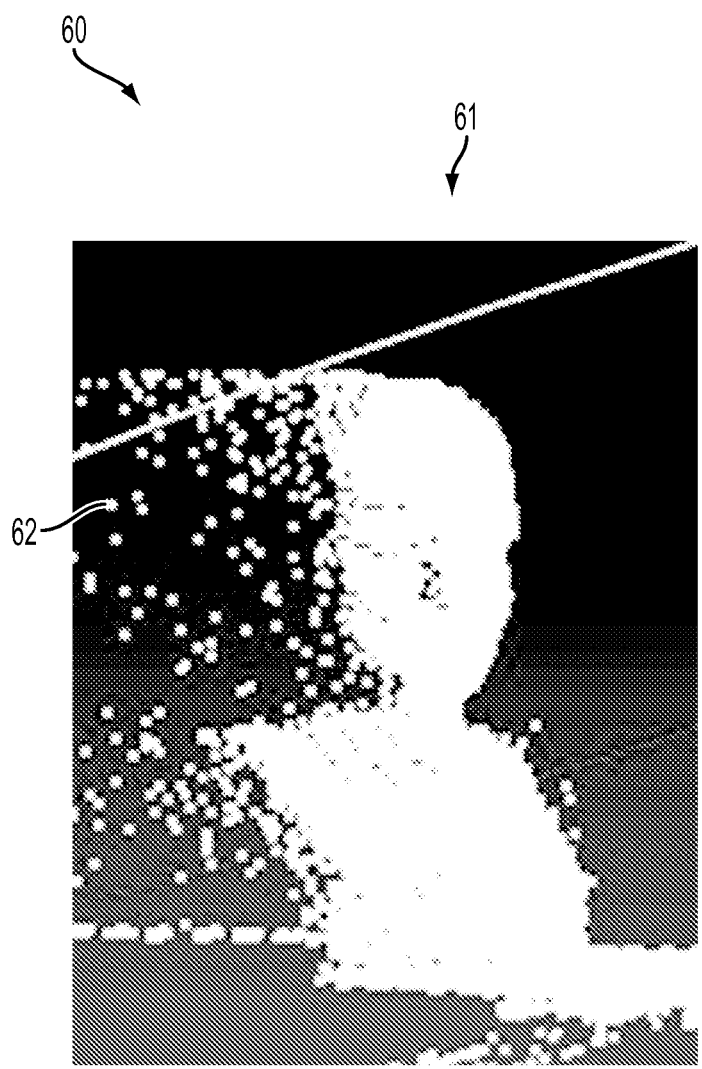
FIG. 5 is a diagram showing, by way of example, a point cloud image of a person inside a vehicle.

The location coordinates are used to generate (step 54) a three-dimensional image, such as a point cloud, that outlines an interior of the vehicle and objects within the vehicle interior. FIG. 5 is a diagram showing, by way of example, a point cloud image of a person inside a vehicle. The image can be generated from the reflection points that are obtained by moving the light beams up and down over a moving vehicle. Specifically, the light beams can scan up and down over different segments of the vehicle. When each beam hits a surface, the beam reflects off the surface at a point of reflection and is directed back towards the lidar system. As the vehicle moves past the lidar system, the points of reflection are most dense where a solid object is detected. The scans of reflection points for the different vehicle segments are combined to generate a point cloud that can be used to outline a surface of the vehicle or objects within the vehicle, such as by commercially available software. The image can be normalized for viewing on an x, y, z coordinate system, rather than at the angle the lidar system obtained the data used to generate the image, which may vary for different sized vehicles.

Subsequently, the 3D image is analyzed (step 54) to determine (step 55) whether occupants are present in the vehicle. A presence or absence of the occupants can be determined, as well as a number of occupants. Once determined, the vehicle occupancy can be compared with a carpool minimum to determine whether the vehicle is properly using a carpool lane. If the vehicle fails to comply with the carpool requirement, a driving infraction or ticket can be generated and mailed to the owner of the vehicle, along with an invoice for payment. Alternatively, tolling fees can be determined based on the occupancy. For example, lidar systems can be used to help enforce compliance with FasTrak® tolling, which charges reduced tolling fees to vehicles with a minimum required occupancy. Currently, specific lanes are designated for carpool lanes, and vehicles are charged tolling fees based on the lanes in which they are located. However, vehicles without the minimum required occupancy will be charged the carpool rate if they drive in the carpool lanes. The lidar systems can be placed in one or more of the lanes to determine an occupancy count of individuals inside each vehicle in that lane. Then, the vehicle owner will be charged tolls based on the determined occupancy count. When the lidar systems are used, specific carpool lanes do not have to be designated since the occupancy of each car is being determined regardless of lane. Further, on the honor system is no longer necessary.

Figure 6:
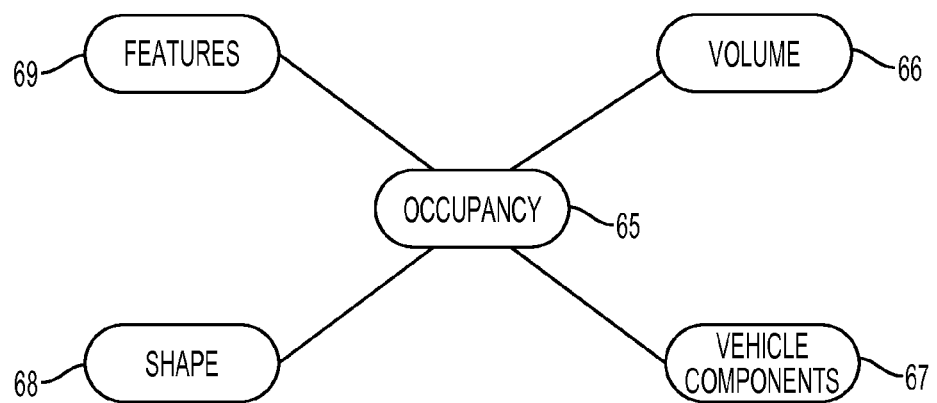
FIG. 6 is a block diagram showing, by way of example, methods for determining occupancy.

The vehicle occupancy can be determined using image recognition or a volume determination. FIG. 6 is a block diagram showing, by way of example, methods for determining occupancy 65. Three-dimensional images of a vehicle's interior can be analyzed to determine occupancy 65 using image volume 66 or image recognition based on human features 69, object shapes 68, or vehicle components 67. Further, a combination of image volume and image recognition can be used to determine occupancy. For a volume determination of occupancy, a volume of objects within the 3D image is calculated and based on the calculated volume amount, a presence or absence of occupancy is determined. Determining occupancy using a volumetric measure is further discussed below in detail with respect to FIG. 8. Further, image recognition can be used to detect occupants based solely on or using a combination of human features, such as facial characteristics and torso features, object shapes, such as silhouettes, and vehicle components, such as front and back seats. For example, when human features are identified, at least one occupant can be determined to be present in the vehicle. Determining occupancy using image recognition is further discussed below in detail with respect to FIG. 7. Additionally, a combination of volume determination and image recognition can be used to determine occupancy, as further described below with reference to FIG. 9.

Once determined, the occupancy can be provided as a presence or absence of occupants, as well as a specific number of occupants. An action, such as sending a tolling invoice or a traffic infraction to an owner of a vehicle, can be triggered (step 57) based on the occupancy determination. An occupancy requirement can be applied to the determined occupancy and when the determined occupancy violates the requirement, action can be taken. For example, in Seattle, Wash., two occupants are required for travel in carpool lanes. If there are less than two occupants, the vehicle is not allowed to use the carpool lanes and can be cited with a ticket, such as by the Washington State Patrol or Seattle Police Department. Meanwhile, in Renton, Wash., two occupants are required to use a designated carpool lane at no cost, and vehicles with less than two occupants are charged a fee.

In one embodiment, if a violation is determined to have occurred, data obtained by the lidar system can be accessed to verify the violation before taking any action. Further, a copy of the 3D image can be sent to the violating individual, such as an owner or driver of the vehicle, with the violation or invoice.

Figure 7:
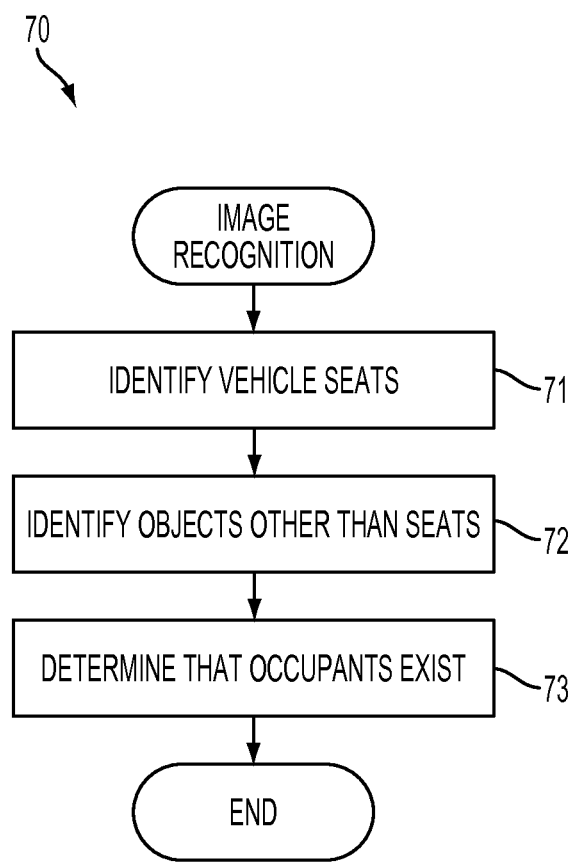
FIG. 7 is a flow diagram showing, by way of example, a method for determining a presence or absence of occupants using image recognition of vehicle seats.

Image recognition can be used to determine a presence or absence of occupants in a vehicle, as well as a number of occupants. FIG. 7 is a flow diagram showing, by way of example, a method for determining a presence or absence of occupants using image recognition of vehicle seats. The 3D image is processed to identify (step 71) vehicle seats and headrests using image recognition techniques. The seats and headrests can be identified using machine learning by training the machine to identify seats and headrests from different types of vehicles. Subsequently, one or more objects, other than the seats and headrests, are identified in the image (step 72) and a determination (step 73) is made that occupants are present in the vehicle. In this example, only the seats and headrests are identified to determine occupancy, without specifically identifying individual occupants.

In a further embodiment, shapes and silhouettes can be used to determine a number of occupants present in the vehicle via machine learning. Specifically, if the shapes and silhouettes are determined to represent an individual, a number of occupants can be determined. Using machine learning, a set of images, such as point cloud images, are provided to a machine along with instructions that the images include a person. The machine extracts features, including shapes, from the images with a person. The features can include rounded versus strait edges and round shapes versus straight lines, as well as other features. Subsequently, further images are provided and the machine classifies the images as having one or more occupants based on the features obtained from the first set of images.

The occupant identity need not be known, only that an object in the vehicle is an occupant. For example, a headrest has a different shape than an individual's head, which is generally more rounded than a headrest. Further, a straight line generally separates two rounded corners of the headrest, similar to a square or rectangle, while a person's head has more of an oval shape. One or more occupants can be identified based on the object shapes represented by the point cloud.

A combination of different occupant features can be used to determine occupancy. For instance, a vector of multiple occupant features identified in the vehicle 3D image can be generated. Each feature can be associated with a value signifying how strongly the feature represents an occupant. The features can include, inter alia, particular shapes representing an occupant and facial features, as well as a height versus width ratio of an object. Other features are possible. Subsequently, the vehicle vector is compared with model vectors to determine whether occupants are present in that vehicle based on a similarity of the vehicle vector with the model vectors. When a similarity of the vectors is high, at least one occupant is likely present. However, if the similarity is low, an occupant is unlikely to be present.

In a further embodiment, an occupant can be identified based on a template, rather than via machine learning. For example, a point cloud image can be compared to a template of a vehicle with at least one occupant to determine whether the point cloud image also includes a representation of an occupant. If the point cloud image matches or substantially matches the template, an occupant is determined to be in the vehicle. Alternatively, a template for a vehicle with no occupants can be used and if the point cloud does not match the template, at least one occupant can be determined to be within the vehicle.

Figure 8:
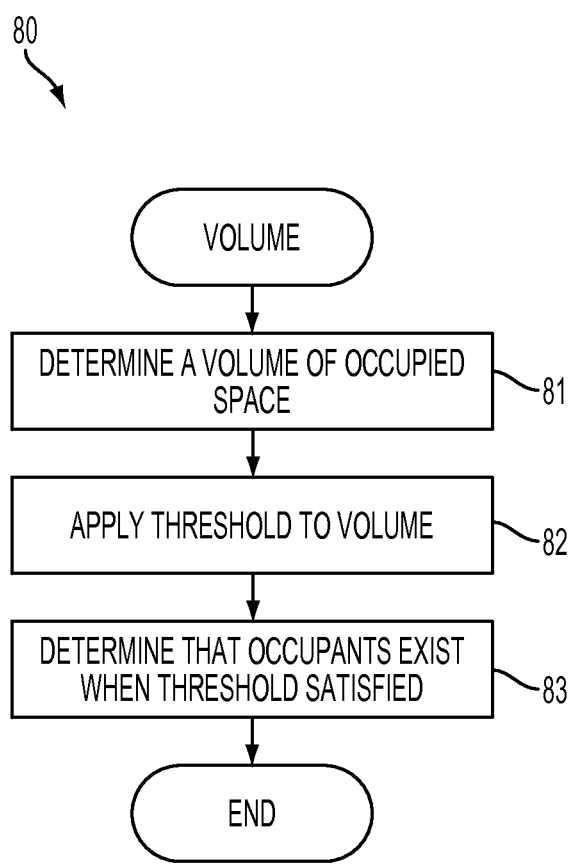
FIG. 8 is a flow diagram showing, by way of example, a method for determining occupancy based on a volumetric measure of an image.

Occupancy can also be determined from the images using volumetric measures. FIG. 8 is a flow diagram showing, by way of example, a method for determining occupancy based on a volumetric measure. A 3D image of a vehicle interior is analyzed to determine (step 81) a volume of the image that is occupied by one or more objects detected by the lidar system. A volumetric threshold can be applied (step 82) to the volume measure of the image to determine an occupancy of the vehicle. The threshold can be determined based on an average volume for seats and other vehicle parts normally found in a vehicle and a volume measure for an average sized occupant. Subsequently, one or more occupants can be determined to be in the vehicle when the volume measure exceeds the threshold. In a further embodiment, a number of occupants can be determined using a predetermined set of volumetric ranges associated with a number of occupants. For example, a volume range of 35 to 42% can indicate one occupant in the vehicle, while a range of 43 to 55% can indicate two occupants, and a range of 56 to 63% can indicate three passengers. Other ranges are possible.

Figure 9:
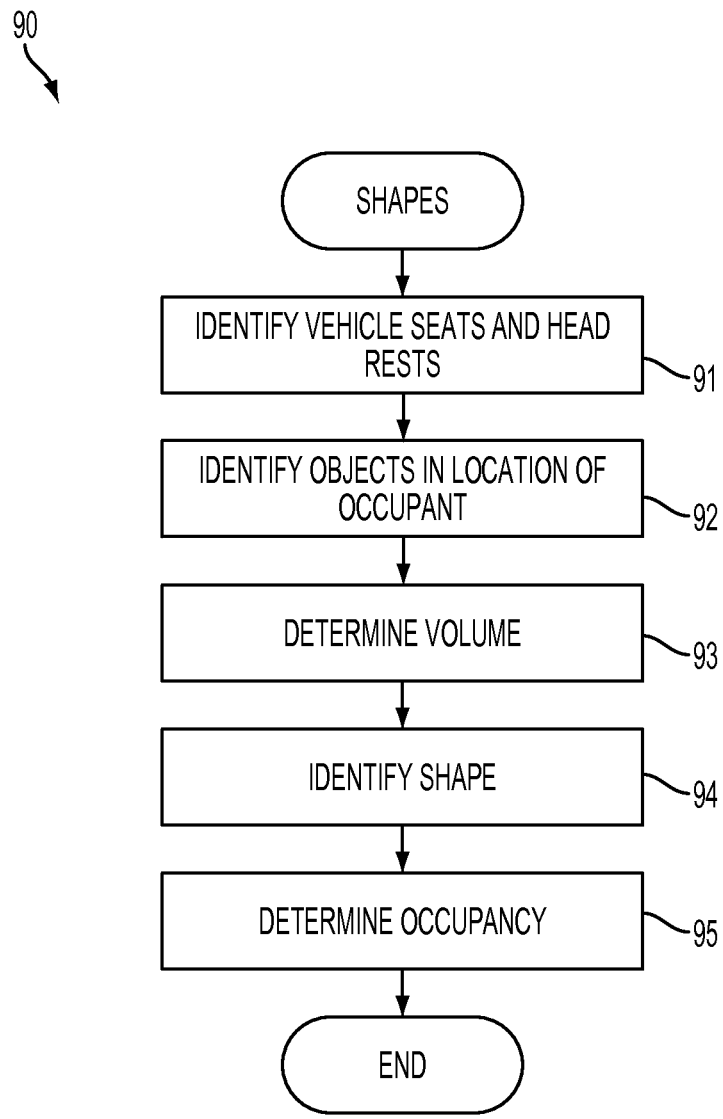
FIG. 9 is a flow diagram showing, by way of example, a method for determining occupancy via a combination of image recognition and volumetric measure.

Further, image recognition can be used with the volumetric measure to determine occupancy. FIG. 9 is a flow diagram showing, by way of example, a method for determining occupancy via a combination of image recognition and volumetric determination. Seats and headrests can be identified (step 91) within the 3D image using, for example, machine learning image recognition. Next, one or more objects are identified (step 92) as being located in or near the seats, in a location that would normally be occupied by an individual. A volume of the object is determined (step 93) and when the volume falls within a range of volumes that can accurately represent an individual, an occupant is determined to be present. To further distinguish the object as an individual from, for instance, a stack of boxes with a size similar to an occupant, a shape or silhouette of the object can be determined (step 94) using image recognition. For example, when the top of the object includes rounded corners, the object resembles the head of an individual more closely than a stack of boxes. However, when the top of the object includes sharp corners, the object is likely to represent something other than an individual.

When the shape or silhouette is determined to be representative of an individual, an occupant is determined (step 95) to be present in the vehicle. However, if the shape is not representative of an individual, a lack of occupants in the vehicle can be determined. Further processing, using other image recognition techniques, is also possible.

In addition to occupancy, the 3D image can also be used to determine vehicle characteristics, including a vehicle type and speed. For determining vehicle type, a three-dimensional image of at least a portion of the vehicle can be generated using consecutive point cloud images, which are obtained as the vehicle passes the lidar system. Specifically, light beams are emitted from the lidar system in an up and down manner and the light r beams encounter different areas of the vehicle, as the vehicle moves past the lidar system. The reflection points obtained for a first portion of the car are combined with reflection points obtained for subsequent portions of the car when the vehicle moves further past the lidar system. The reflection point images are then combined in consecutive order to generate the point cloud image for the vehicle. The vehicle type can then be determined from the image.

Alternatively, the lidar system can be used to detect vehicle components, such as wheels, for determining vehicle type. The vehicle or wheel images can then be used to distinguish between different models, brands, and types of vehicles, including cars, vans, trucks, buses, and motorcycles. For instance, a vehicle with eight wheels is likely to represent a bus or semi-truck, while a vehicle with four wheels likely represents a truck or car. Additionally, the type of vehicle can also be used to determine occupancy. For example, semi-trucks usually include a single occupant, the driver, while buses generally include multiple occupants.

The speed of a vehicle can also be determined from the three-dimensional image. As the vehicle passes by the lidar system, returns are generated based on light beams emitted from the lidar system that reflect off the vehicle or objects within the vehicle. Once the vehicle has passed, no further returns are received until a further vehicle passes by the lidar system. A standard vehicle length can be used with the return data to determine a speed of the car. Alternatively, the type of vehicle can be determined using a point cloud generated from the reflection points of the returns, a described above. Subsequently, the vehicle type can be used to determine a length of the vehicle, which is then used to determine a speed based on an amount of returns received by the lidar system.

Further, the vehicle length and height can be used to normalize the point cloud image, which can be compressed due to the speed of the vehicle past the lidar system. The lidar system emits light beams that scan over the vehicle in an up and down motion. As the vehicle moves past the lidar system, different scans are obtained based on the portion of the vehicle currently in front of the lidar system. In one example, as the vehicle moves past the lidar system scans of reflection points are generated, and 1000 scans are obtained for a particular vehicle that is 10 feet long. The distance between the scans are determined to generate an image that is not compressed, but rather expanded to represent the length of the vehicle. In this example, the height of the vehicle obtained from the scans is already true to the size. In addition, the windows of the vehicle can be used to help normalize the scans, such as based on a standard window size.

In a further embodiment, a camera can be installed adjacent to a lidar system to determine occupancy. The camera can capture a photograph of the vehicle, while the lidar system obtains data for generating a point cloud. The point cloud provides additional information to the photograph and helps disambiguate images in the photograph. In one example, a portion of the backseat within the vehicle may be occluded by a headrest for the front seat. The point cloud can then be used to determine whether any occupants are present in the back seat.

Although the above has been described with respect to determining occupancy of a vehicle. Other embodiments are possible, such as identifying objects or people within a vehicle that have been taken without authorization, such as during a theft.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for determining vehicle occupancy, comprising:
light beam pulses emitted from a lidar system to a vehicle passing by the lidar system;
a scanner to generate scans of an object from the light beam pulses, each scan comprising:
a signal receipt module to receive a signal from each of the beam pulses reflected at a point of reflection along a segment of the passing vehicle;
a time module to measure a time from when each beam pulse was emitted from the lidar system to receipt of the signal;
a distance module to calculate a distance of the signal from the lidar system using the measured time;
a position module to position the points of reflection for that vehicle segment in relation to one another as a scan;
a compiler to compile the scans in a consecutive order according to the vehicle and generating a three-dimensional image of an interior of the vehicle from the consecutive scans; and
an occupancy determination module to determine at least one of a presence and absence of vehicle occupancy based on the three-dimensional image, comprising at least one of:
a volume occupancy module to calculate the occupancy by determining a volume within the three-dimensional image, applying a threshold to the volume, and determining that the occupancy exists when the volume satisfies the threshold; and
a shape occupancy module to calculate the occupancy by determining a shape of an object within the three-dimensional image, comparing the shape with a common list of shapes for occupants, and determining the occupancy based on the comparison.

2. A system according to claim 1, wherein the lidar system is affixed to at least one of a structure in a stationary position and to one or more of lamp posts, bridges, walls, support posts, and barriers.

3. A system according to claim 1, wherein the three-dimensional image comprises an outline one or more occupants located within the interior of the vehicle.

4. A system according to claim 1, further comprising:
an occupancy calculation module to calculate a number of occupants, comprising:
a comparison module to compare the volume with a standard volume of an empty vehicle; and
a volume occupancy module to determine the number of occupants based on the volume comparison.

5. A system according to claim 1, further comprising:
a violation module to determine whether a traffic violation has occurred based on the occupancy, comprising:
a counting module to count a number of occupants;
a threshold module to apply a threshold number of occupants to the counted number of occupants; and
a violation identification module to identify the traffic violation when the counted number of occupants is below the threshold number of occupants.

6. A system according to claim 5, further comprising:
a database to access raw data as a verification of the image when the traffic violation is identified.

7. A system according to claim 1, further comprising:
a vehicle determination module to determine a type of the vehicle based on the three-dimensional image.

8. A system according to claim 1, further comprising:
an image comparison module to compare the three-dimensional image to a model of vehicle seats;
a seat determination module to determine an outline of seats in the vehicle based on the model; and
an occupancy identification module to determine the presence and absence of occupants, comprising at least one of:
an object identification module to identify an object in the three-dimensional image in addition to the seats and determining the presence of occupants in the vehicle based on the identified object; and
an outline module to identify only the outline of seats in the image and determining the absence of occupants in the vehicle.

9. A system according to claim 1, further comprising:
a photograph of at least a portion of the vehicle; and
an occupancy identification module to utilize the three-dimensional image to disambiguate images within the photograph as a determination of the occupancy.

10. A computer-implemented method for determining vehicle occupancy, comprising:
applying light beam pulses emitted from a lidar system to a vehicle passing by the lidar system;
generating scans of an object from the light beam pulses, each scan comprising:
receiving a signal from each of the beam pulses reflected at a point of reflection along a segment of the passing vehicle,
measuring a time from when each beam pulse was emitted from the lidar system to receipt of the signal;
calculating a distance of the signal from the lidar system using the measured time; and
positioning the points of reflection for that vehicle segment in relation to one another as a scan;
compiling the scans in a consecutive order according to the vehicle and generating a three-dimensional image of an interior of the vehicle from the consecutive scans; and
determining at least one of a presence and absence of vehicle occupancy based on the three-dimensional image, comprising at least one of:
calculating the occupancy, comprising:
determining a volume within the three-dimensional image;
applying a threshold to the volume; and
determining that the occupancy exists when the volume satisfies the threshold; and calculating the occupancy, comprising:
  determining a shape of an object within the three-dimensional image;
  comparing the shape with a common list of shapes for occupants; and
  determining the occupancy based on the comparison.

11. A method according to claim 10, further comprising at least one of:
  affixing a lidar system to one or more of lamp posts, bridges, walls, support posts, and barriers; and
  affixing the lidar system in a stationary position on a structure, wherein the lidar system emits multiple beams.

12. A method according to claim 10, wherein the three-dimensional image comprises an outline one or more occupants located within the interior of the vehicle.

13. A method according to claim 10, further comprising:
calculating a number of occupants, comprising:
  comparing the volume with a standard volume of an empty vehicle; and
  determining the number of occupants based on the volume comparison.

14. A method according to claim 10, further comprising:
determining whether a traffic violation has occurred based on the occupancy, comprising:
  counting a number of occupants; and
  applying a threshold number of occupants to the counted number of occupants; and
  identifying the traffic violation when the counted number of occupants is below the threshold number of occupants.

15. A method according to claim 14, further comprising:
accessing raw data as a verification of the image when the traffic violation is identified.

16. A method according to claim 10, further comprising:
determining a type of the vehicle based on the three-dimensional image.

17. A method according to claim 10, further comprising:
comparing the three-dimensional image to a model of vehicle seats;
determining an outline of seats in the vehicle based on the model; and
determining the presence and absence of occupants, comprising at least one of:
  identifying an object in the three-dimensional image in addition to the seats and determining the presence of occupants in the vehicle based on the identified object; and
  identifying only the outline of seats in the image and determining the absence of occupants in the vehicle.

18. A method according to claim 10, further comprising:
obtaining a photograph of at least a portion of the vehicle; and
utilizing the three-dimensional image to disambiguate the images within the photograph as a determination of the occupancy.

* * * * *